US012803960B2

(12) United States Patent
Baker et al.

(10) Patent No.: US 12,803,960 B2
(45) Date of Patent: Nov. 17, 2026

(54) PSEUDO-RANDOM ANONYMIZATION AND STORAGE OF INTERNET PROTOCOL (IP) ADDRESSES

(71) Applicant: Oracle International Corporation, Redwood Shore, CA (US)

(72) Inventors: Christopher Robert Baker, Nashua, NH (US); Peter Martin Hanily, Dublin (IE); Ryan Daniel Schilcher, Seattle, WA (US); Jonathan Philip Taimanglo, Arlington, VA (US)

(73) Assignee: Oracle International Corporation, Redwood Shores (CA)

( * ) Notice: Subject to any disclaimer, the term of this patent is extended or adjusted under 35 U.S.C. 154(b) by 144 days.

(21) Appl. No.: 19/057,531

(22) Filed: Feb. 19, 2025

(65) Prior Publication Data

US 2026/0246764 A1 Aug. 20, 2026

(51) Int. Cl.
*H04L 9/40* (2022.01)

(52) U.S. Cl.
CPC ................................ *H04L 63/0421* (2013.01)

(58) Field of Classification Search
None
See application file for complete search history.

(56) References Cited

U.S. PATENT DOCUMENTS

2020/0220804 A1* 7/2020 Mathews ................ H04L 45/12
2020/0382473 A1* 12/2020 Govindarajan ....... H04L 63/168
2023/0126692 A1* 4/2023 Ben David ........... G06F 21/552
726/22

* cited by examiner

*Primary Examiner* — Nelson S. Giddins
(74) *Attorney, Agent, or Firm* — Mughal Gaudry & Franklin PC

(57) ABSTRACT

Techniques for anonymization and storage of Internet Protocol (IP) addresses are disclosed. An IP address is processed, to generate a character value. The character value is generated from one of (i) the IP address, (ii) a modified version of the IP address generated by applying a random or pseudo-random seed to the IP address, or (iii) a truncated version of the IP address generated by setting a pre-selected number of least significant bits of the IP address to zero. The character value is encoded using an encoding scheme, to generate a first encoded character value for the IP address. The IP address is mapped to either (i) the first encoded character value, or (ii) a second encoded character value that is at least in part similar to the first encoded character value. The mapped first encoded character value or the second encoded character value is stored in a storage repository.

20 Claims, 12 Drawing Sheets

TABLE 200: Example grouping arrangements of an example IP address 192.168.1.1

| Group arrangement serial number | Grouping | Number of groups |
|---|---|---|
| 1 | (192)(168)(1)(1) | 4 |
| 2 | (192.168)(1.1) | 2 |
| 3 | (192.168.1)(1) | 2 |
| 4 | (192.168.1.1) | 1 |

FIG. 2

TABLE 300: Example character ordinal determination for various grouping arrangements and for an example IP address 192.168.1.1

<table>
<tr><th>Group arrangement serial number</th><th>Grouping</th><th>Character ordinal determination</th></tr>
<tr><td>1</td><td>(192)(168)(1)(1)</td><td>CHAR(192) || CHAR(168) || CHAR(1) || CHAR(1)</td></tr>
<tr><td>2</td><td>(192.168)(1.1)</td><td>CHAR( (192 || 168) || CHAR(001 || 001)</td></tr>
<tr><td>3</td><td>(192.168.1)(1)</td><td>CHAR(192 || 168 || 001) || CHAR(001)</td></tr>
<tr><td>4</td><td>(192.168.1.1)</td><td>CHAR(192 || 168 || 001 || 001)</td></tr>
</table>

FIG. 3

TABLE 400: Example character encoding for various grouping arrangements and for an example IP address 192.168.1.1

| Group arrangement serial number | Grouping | Character ordinal determination | Base64 encoding |
|---|---|---|---|
| 1 | (192)(168)(1)(1) | CHAR(192) \|\| CHAR(168) \|\| CHAR(1) \|\| CHAR(1) | Base64(CHAR(192) \|\| CHAR(168) \|\| CHAR(1) \|\| CHAR(1)) |
| 2 | (192.168)(1.1) | CHAR( (192 \|\| 168) \|\| CHAR(001 \|\| 001) | Base64(CHAR( (192 \|\| 168) \|\| CHAR(001 \|\| 001)) |
| 3 | (192.168.1)(1) | CHAR(192 \|\| 168 \|\| 001) \|\| CHAR(001) | Base64(CHAR(192 \|\| 168 \|\| 001) \|\| CHAR(001)) |
| 4 | (192.168.1.1) | CHAR(192 \|\| 168 \|\| 001 \|\| 001) | Base64(CHAR(192 \|\| 168 \|\| 001 \|\| 001)) |

FIG. 4

TABLE 500: Encoded character for various grouping arrangements and for an example IP address 192.168.1.1

| Group arrangement serial number | Grouping | Character ordinal determination | Character ordinal determination | Base64 encoding result |
|---|---|---|---|---|
| 1 | (192)(168)(1)(1) | CHAR(192) \|\| CHAR(168) \|\| CHAR(1) \|\| CHAR(1) | Base64(CHAR(192) \|\| CHAR(168) \|\| CHAR(1) \|\| CHAR(1)) | AMAAqAABAAE= |
| 2 | (192.168)(1.1) | CHAR( (192 \|\| 168) \|\| CHAR(001 \|\| 001) | Base64(CHAR( (192 \|\| 168) \|\| CHAR(001 \|\| 001)) | 7qgAAQ== |
| 3 | (192.168.1)(1) | CHAR(192 \|\| 168 \|\| 001) \|\| CHAR(001) | Base64(CHAR(192 \|\| 168 \|\| 001) \|\| CHAR(001)) | UpEAAQ== |
| 4 | (192.168.1.1) | CHAR(192 \|\| 168 \|\| 001 \|\| 001) | Base64(CHAR(192 \|\| 168 \|\| 001 \|\| 001)) | Oas= |

FIG. 5

TABLE 600: Encoded character values for various grouping arrangements and for various example IP addresses

| IP address | Grouping arrangement 1 | Grouping arrangement 2 | Grouping arrangement 3 | Grouping arrangement 4 |
|---|---|---|---|---|
| 192.168.1.1 | AMAAqAABAAE= | 7qgAAQ== | UpEAAQ== | Oas= |
| 192.168.1.2 | AMAAqAABAAI= | 7qgAAQ== | UpEAAg== | Oaw= |
| 192.168.2.1 | AMAAqAACAAE= | 7qgAAg== | UpIAAQ== | ObU= |
| 10.168.1.1 | AAoAqAABAAE= | J7gAAQ== | jTEAAQ== | g+s= |

FIG. 6

TABLE 700: Similarity distances between encoded character values corresponding to various grouping arrangements and for two example IP addresses

| Grouping arrangements | Encoded character values for 192.168.1.1 (e.g., B1) | Encoded character values for 192.168.1.2 (e.g., B2) | Similarity distance between B1 and |
|---|---|---|---|
| 1 | AMAAqAABAAE= | AMAAqAABAAI= | 91 |
| 2 | 7qgAAQ== | 7qgAAQ== | 100 |
| 3 | UpEAAQ== | UpEAAg== | 88 |
| 4 | Oas= | Oaw= | 75 |

FIG. 7

TABLE 800: Encoded character values corresponding to grouping arrangement 4 and for various example IP addresses having the same first two octets

| IP address | Encoded character value for grouping arragment 4 |
|---|---|
| 192.168.1.1 | Oas= |
| 192.168.1.2 | Oaw= |
| 192.168.1.3 | Oa0= |
| 192.168.1.64 | QOQ= |
| 192.168.2.1 | ObU= |
| 192.168.2.128 | itA= |
| 192.168.3.1 | Ob8= |
| 192.168.3.255 | jzc= |

FIG. 8

TABLE 900: A range of IP addresses covered by a single encoded character value, for various grouping arrangements

| Grouping arrangements | Encoded character value | IP address range covered | Similarity distance between encoded character values corresponding to 192.168.1.1 to 192.168.1.255 |
|---|---|---|---|
| 1 | AMAAqAABAAE= | 192.168.1.1 | 84 |
| 2 | 7qgAAQ== | 192.168.1.1 to 192.168.1.255 | 100 |
| 3 | UpEAAQ== | 192.168.1.1 | 75 |
| 4 | Oas= | 192.168.1.1 | 25 |

FIG. 9

TABLE 1000: Similarity distances between encoded character values corresponding grouping arrangement 4 and for two example IP addresses

| Grouping arrangements | Encoded character values for 192.168.1.1 (e.g., B1) | Encoded character values for 192.168.1.2 (e.g., B2) | Similarity distance between B1 and |
|---|---|---|---|
| 4 | Oas= | Oaw= | 75 |
| **Storage arrangement 1**: Both IP addresses 192.168.1.1 and 192.168.1.2 are stored as Oas= | | | |
| **Storage arrangement 2**: Both IP addresses 192.168.1.1 and 192.168.1.2 are stored as Oaw= | | | |
| **Storage arrangement 3**: Both IP addresses 192.168.1.1 and 192.168.1.2 are stored as an encode character value (e.g., Oaa=) that is more than a threshold similarity distance from both the encode character values Oas= and Oaw= | | | |

FIG. 10

TABLE 1200: Encoded character values for different IP addresses and for different grouping arrangements, after application of a seed value of "264879982"

| IP address | Grouping arrangement 1 | Grouping arrangement 2 | Grouping arrangement 3 | Grouping arrangement 4 |
|---|---|---|---|---|
| 192.168.1.1 | LX4tZiy/LL8= | BQcWYA== | DCa5lg== | RNs= |
| 192.168.1.2 | LX4tZiy/LMA= | BQcWYA== | DCa5lw== | RNw= |
| 192.168.2.1 | LX4tZizALL8= | BQcWYQ== | DCe5lg== | ROU= |
| 10.168.1.1 | LMgtZiy/LL8= | PhcWYA== | Rsa5lg== | jxs= |

FIG. 12

PSEUDO-RANDOM ANONYMIZATION AND STORAGE OF INTERNET PROTOCOL (IP) ADDRESSES

BACKGROUND

With the advent of the Internet, organizations routinely collect data, such as browsing history, user preferences, IP addresses of end user devices, etc. However, data privacy has gained a lot of interest in recent years. For example, comprehensive data privacy laws prohibit misuse of information held on private individuals. Such laws have been adopted in many different parts of the world. For example, the European Union has enacted the General Data Protection Regulation (GDPR), which limits collection, retention, and/or use of an individual's personal data. In the United States, California also has passed the California Consumer Privacy Act (CCPA), similarly limiting collection, retention, and/or use of personal data. Importance of ensuring data privacy compliance has increased.

BRIEF SUMMARY

In various embodiments, a non-transitory computer-readable medium includes instructions that when executed by one or more processors, cause a system including the one or more processors to perform operations including: accessing an Internet Protocol (IP) address; processing the IP address, wherein processing the IP address comprises generating a character value; encoding the character value using an encoding scheme, to generate a first encoded character value for the IP address; mapping the IP address to either (i) the first encoded character value, or (ii) a second encoded character value that is at least in part similar to the first encoded character value; and storing, in a storage repository, the mapped first encoded character value or the second encoded character value. In an example, processing the IP address comprises: applying a seed to the IP address, to generate a modified IP address; and generating the character value corresponding to the modified IP address. In an example, the operations further comprise: randomly or pseudo-randomly generating the seed. In an example, processing the IP address comprises: setting a pre-selected number of least significant bits of the IP address to zero, to generate a truncated IP address; and generating the character value corresponding to the truncated IP address. In an example, mapping the IP address comprises: subsequent to generating the first encoded character value for the IP address, determining a similarity distance between the first encoded character value and the second encoded character value; and in response to the similarity distance being more than a threshold, mapping the IP address to the second encoded character value. In an example, the operations further comprise: for each IP address of a plurality of IP addresses, generating a corresponding plurality of encoded character values; determining that similarity distances between each of the plurality of encoded character values and the second encoded character value is more than a threshold value; and in response to the similarity distances being more than the threshold, mapping the plurality of IP address to the second encoded character value.

In an example, the character value is a first character value, processing the IP address comprises: identifying four octets within the IP address or a modified version of the IP address; grouping, in two or more groups, the four octets; for each group of the two or more groups, generating a corresponding character value, such that two or more character values are respectively generated for the two or more groups; and concatenating the two or more character values, to thereby generate the first character value. In an example, grouping the four octets comprises grouping the four octets of the modified version of the IP address; and the operations further comprise generating the modified version of the IP address by one of (i) setting a pre-selected number of least significant bits (LSBs) of the IP address to zero or (ii) applying a seed to the IP address. In an example, generating the modified version of the IP address comprises applying the seed to the IP address; and applying the seed to the IP address comprises one of (i) applying the seed to each group of the two or more groups, or (ii) applying the seed to an entirety of the IP address. In an example, the IP address is a first IP address, the character value is a first character value, and the operations further include: processing a second IP address, wherein processing the second IP address comprises generating a second character value; and encoding the second character value using the encoding scheme, to generate the first encoded character value for the second IP address, such that the first encoded character value is generated for both the first and the second IP addresses.

In an example, the encoding scheme is a binary-to-text encoding scheme. In an example, the encoding scheme is a base64 encoding scheme. In an example, the IP address is a IPv4 (Internet Protocol version 4) IP address. In an example, the IP address is a IPv6 (Internet Protocol version 6) IP address.

In various embodiments, a method comprises: accessing an Internet Protocol (IP) address; processing the IP address, wherein processing the IP address comprises generating a character value; encoding the character value using an encoding scheme, to generate a first encoded character value for the IP address; mapping the IP address to either (i) the first encoded character value, or (ii) a second encoded character value that is at least in part similar to the first encoded character value; and storing, in a storage repository, the mapped first encoded character value or the second encoded character value. In an example, processing the IP address comprises: applying a seed to the IP address, to generate a modified IP address; and generating the character value corresponding to the modified IP address. In an example, processing the IP address comprises: setting a pre-selected number of least significant bits of the IP address to zero, to generate a truncated IP address; and generating the character value corresponding to the truncated IP address. In an example, mapping the IP address comprises: subsequent to generating the first encoded character value for the IP address, determining a similarity distance between the first encoded character value and the second encoded character value; and in response to the similarity distance being more than a threshold, mapping the IP address to the second encoded character value.

In various embodiments, a system comprises: one or more processors; and one or more non-transitory computer-readable media storing instructions, which, when executed by the system, cause the system to perform operations including: accessing an Internet Protocol (IP) address; processing the IP address, wherein processing the IP address comprises generating a character value; encoding the character value using an encoding scheme, to generate a first encoded character value for the IP address; mapping the IP address to either (i) the first encoded character value, or (ii) a second encoded character value that is at least in part similar to the first encoded character value; and storing, in a storage repository, the mapped first encoded character value or the second encoded character value. In an example, processing the IP address comprises: applying a seed to the IP address, to generate a modified IP address; and generating the character value corresponding to the modified IP address.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 2 illustrates a table depicting four example grouping arrangements of an example IP address.

FIG. 3 illustrates a table depicting character ordinal determinations for four example grouping arrangements depicted in the table of FIG. 2.

FIG. 4 illustrates a table depicting base64 encoding equations for four example determined character ordinals corresponding to four example grouping arrangements of the table of FIG. 3, and for an example IP address.

FIG. 5 illustrates a table depicting base64 encoding results for four example determined character ordinals corresponding to four grouping arrangements of the table of FIG. 3, and for an example IP address.

FIG. 6 illustrates a table depicting encoded character values for various grouping arrangements and for various example IP addresses.

FIG. 7 illustrates a table depicting similarity distances between encoded character values corresponding to various grouping arrangements and for two example IP addresses 192.168.1.1 and 192.168.1.2.

FIG. 8 illustrates a table depicting encoded character values corresponding to an example grouping arrangement and for various example IP addresses.

FIG. 9 illustrates a table depicting a range of IP addresses covered by an encoded character value, for various grouping arrangements.

FIG. 10 illustrates a table depicting three example storage arrangements for two example IP addresses.

FIG. 12 illustrates encoded character values for different IP addresses and for different grouping arrangements, after application of a seed value.

DETAILED DESCRIPTION

Figure 1:
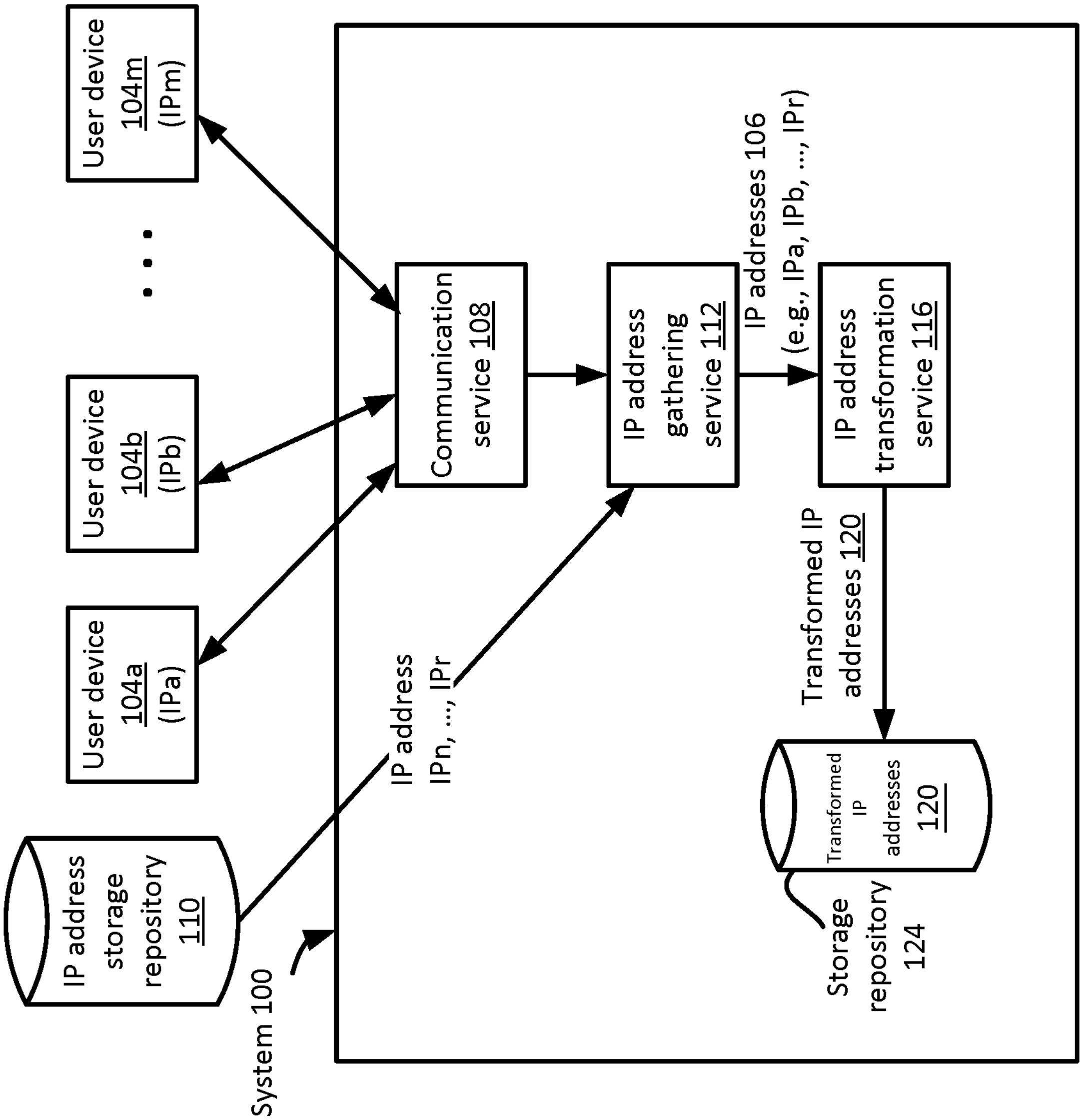
FIG. 1 illustrates a system for anonymizing Internet Protocol (IP) addresses, and storing the anonymized IP addresses.

As described above, ensuring data privacy compliance is of importance in the modern era of Internet. There may be conflicting data storage and data privacy objectives within an organization. For example, the organization may want to store user information (such as Internet Protocol (IP) addresses), but such storage of user information may violate one or more organizational policies and/or governmental regulations. Accordingly, the organization may want to store user information (such as IP addresses), while keeping in mind data privacy guidelines and polices regarding such storage of user information.

In an example, an organization may operate an IP address management system for anonymizing IP addresses, and storing the anonymized IP addresses. The IP address management system receives IP addresses of one or more end user devices that access organization infrastructure, and/or cloud infrastructure owned by or rented out to the organization. The organization may want to keep track of and store the IP addresses, e.g., for a variety of reasons, such as fraud detection and/or prevention, recordkeeping, providing targeted advertisements to the users, and/or the like. However, due to privacy and/or data security concerns, there may be internal organizational policy and/or government regulations on how such IP addresses can be stored. For example, in some jurisdictions in the European Union (EU), an organization may not store a list of usernames and corresponding IP addresses. In another example, in some government jurisdictions, different amounts of information can be retained, based on a classification of the IP space from which the connections originated. For example, if the IP space is confirmed or estimated to have originated from a data center or a commercial organization, retention standards for information (such as IP addresses) may be less stringent than if the IP space originated from residential areas.

Accordingly, in an example, instead of storing the IP addresses in its original cleartext form (e.g., storing the actual IPv4 or IPv6 address), the IP address management system transforms and anonymizes the IP addresses, and stores the anonymized and transformed IP addresses. For example, the IP address management system comprises an IP address transformation service, which transforms individual IP addresses to transformed IP addresses, and stores the transformed IP addresses in a storage repository (e.g., without any corresponding long-term storage of the actual IP addresses). Example techniques have been described below for transformation of an IP address.

An IP address comprises two groups of bits in the address: (i) the most significant bits (MSBs) representing a network prefix, which identifies a whole network or subnet, and (ii) the least significant bits (LSBs) representing a host identifier, which specifies a particular interface of a host on that network. This division between the most significant bits and the least significant bits may be used as the basis of traffic routing between IP networks and for address allocation policies. For example, an IPv4 IP address, when represented in a CIDR (Classless Inter-Domain Routing) form, may be appended with its associated network mask. For example, the network mask appended with the IP address may indicate a number of MSBs used to represent a network portion of the IP address. For example, an example IP address 192.168.1.0 may be appended with/24, such that the complete IP address is 192.168.1.0/24. The "/24" implies that the first or most significant 24 bits (e.g., the 24 MSBs) of the IP address are for the network address, leaving remaining least significant 8 bits (e.g., 8 LSBs) for host addresses.

In an example, a group of IP addresses may have some similarity, such as belonging to the same/24 network (or to a same/16 network). As described below in further detail, similar IP addresses may be categorized in a same category and stored as a group.

In an example, to identify similar IP addresses and/or to anonymize IP addresses prior to storing, the IP addresses are initially transformed into corresponding encoded character values, as described below in further detail. In an example, transformation of an IP address to corresponding encoded character values may comprise the following operations: (i) grouping of octets of the IP address, (ii) character ordinal determinations of the groups, and (iii) applying a character encoding algorithm to the determined character ordinal, such as using a base64 encoding, to generate encoded character value for the IP address. Each of these processes have been described below in further detail.

If two IP addresses are at least in part similar (such as associated with the same/24 network or the same/16 network), the likelihood of the encoded character values of these two IP addresses being close to or similar to each other may be relatively high.

Once the IP addresses are transformed into the corresponding encoded character values, similarity distances between the IP addresses may be calculated. IP addresses having relatively high similarity distance (e.g., implying that their encoded character values are at least in part similar) may be categorized into a same group, as described below in further detail. In an example, storing IP addresses of the same category (such as from the same network address) as a group and as an encoded character value, without storing the actual and individual IP addresses, result in efficient storage of at least some information associated with the IP addresses, as well as at least in part anonymizes the IP addresses.

Other anonymization techniques are also described below. For example, storage of an IP address may be further anonymized, e.g., by adding a random or pseudo-random seed value to the IP address, e.g., during the above-described transformation of the IP address to the corresponding encoded character value, as will be described below in this disclosure.

In an example, storage of an IP address may be further anonymized, e.g., by setting a pre-configured number of LSBs of each IP address to zero. The resultant IP addresses are referred to as truncated IP addresses. The truncated IP addresses are then then converted to corresponding encoded character values. Thus, in this example, assuming that/24 network addresses of each IP addresses are to be retained (e.g., the 8 LSBs are set to zero), all IP addresses in the IP address range 192.168.001.001 to 192.168.001.255 are truncated to the same truncated IP address of 192.168.001.000.

Thus, as described herein in further detail, in scenarios where seed values are not added to the IP addresses, anonymization of the IP addresses are achieved using techniques such as one of (i) converting IP addresses into corresponding encode character values, and storing multiple encode character values corresponding to multiple IP addresses as a group, (ii) truncating IP addresses by setting a pre-configured number of LSBs of the IP addresses to zero, and determining and storing the encode character values of the truncated IP addresses, and/or (iii) simply storing the encode character values corresponding to the IP addresses. One or more such techniques can also be applied for storing of IP addresses to which seed values have been applied.

Example System for Anonymizing IP Addresses

FIG. 1 illustrates a system 100 for anonymizing Internet Protocol (IP) addresses, and storing the anonymized IP addresses. The system 100 includes a communication service 108 that communicates with a plurality of user devices 104_a_, . . . , 104M. The communication service 108 communicates with the user devices 104 for a variety of reasons, such as to provide a service to the user devices 104, receive request(s) from the user devices 104, transmit responses(s) to the user devices 104, and/or the like. Merely as an example, the communication service 108 may be a part of a system hosting a website or a cloud-based hosted application program, and the user devices 104_a_, . . . , 104_m_ may communicate with the communication service 108 while visiting the website and/or while using the application program. Other example deployment of the communication service 108 may also be possible.

Each user device 104 has a corresponding IP address, such as IP address IPa for user device 104_a_, IP address IPb for user device 104_b_, IP address IPm for user device 104_m_, and so on. One or more of the IP addresses IPa, . . . IPm may be tracked by the communication device 108, in an example.

In an example, the system 100 comprises an IP address gathering service 112, which gathers the IP addresses IPa, . . . , IPm from the communication device 108. Additionally (or alternatively), the IP address gathering service 112 also receives one or more IP addresses (such as IP addresses IPn, . . . , IPr) from an IP address storage repository 110. The IP address storage repository 110 may provide the IP addresses to the system 100 for a variety of commercial or organization reasons. Thus, for the example of FIG. 1, the IP address gathering service 112 gathers IP addresses IPa, IPb, . . . , IPm, IPn, . . . , IPr, where these IP addresses are collectively referred to herein as IP addresses 106.

Individual ones of the IP addresses 106 may be an IPv4 (Internet Protocol version 4) address or an IPv6 address. Some of the below description pertain to anonymization and storage of IPv4 addresses, but such techniques described herein can be extended to IPv6 addresses as well, as would be appreciated by those skilled in the art based on the description herein.

In an example, the system 100 may be operated by an organization, such as a cloud provider, an e-commerce platform, a financial institution, a website owner, etc. The system 100 receives data from multiple users and/or other organizations. The system 100 may want to track a source of the data, e.g., for a variety of reasons, such as fraud prevention, recordkeeping, providing targeted advertisements to the users, and/or the like. In an example, the system 100 may want to keep track of IP addresses 106 from which data is received. However, due to privacy and/or data security concerns, there may be internal organizational policy and/or government regulations on how such IP addresses 106 can be stored. For example, in some jurisdictions in the European Union (EU), an organization may not store a list of usernames and corresponding IP addresses.

In another example, in some government jurisdictions, different amounts of information can be retained, based on a classification of the IP space from which the connections originated. For example, if the IP space is confirmed or estimated to have originated from a data center or a commercial organization, retention standards for information (such as IP addresses) may be less stringent than if the IP space originated from residential areas.

Accordingly, in an example, instead of storing the IP addresses 106 in its original cleartext form (e.g., storing the actual IPv4 or IPv6 address), the system 100 transforms and anonymizes the IP addresses 106 (referred to as transformed IP addresses 120 in FIG. 1), and stores the anonymized and transformed IP addresses 120. For example, the system 100 comprises an IP address transformation service 116, which transforms individual IP addresses 106 to transformed IP addresses 120, and stores the transformed IP addresses 120 in a storage repository 124, as illustrated in FIG. 1.

An IP address comprises two groups of bits in the address: (i) the most significant bits (MSBs) representing a network prefix, which identifies a whole network or subnet, and (ii) the least significant bits (LSBs) representing a host identifier, which specifies a particular interface of a host on that network. This division between the most significant bits and the least significant bits may be used as the basis of traffic routing between IP networks and for address allocation policies. For example, an IPv4 IP address, when represented in a CIDR (Classless Inter-Domain Routing) form, may be appended with its associated network mask. For example, the network mask appended with the IP address may indicate a number of MSBs used to represent a network portion of the IP address. For example, an example IP address 192.168.1.0 may be appended with/24, such that the complete IP address is 192.168.1.0/24. The "/24" implies that the first or most significant 24 bits (e.g., the 24 MSBs) of the IP address are for the network address, leaving remaining least significant 8 bits (e.g., 8 LSBs) for host addresses.

In an example, a group of IP addresses may have some similarity, such as belonging to the same/24 network (or to a same/16 network). As described below in further detail, similar IP addresses may be categorized in a same category and stored as a group.

In an example, to identify similar IP addresses and/or to anonymize IP addresses prior to storing, the IP addresses are initially transformed into corresponding encoded character values. Any type of transformation may be used to transform an IP address into corresponding encoded character values, such as Bayesian Ordinal Relational Transform (BORT). If two IP addresses are at least in part similar (such as associated with the same/24 network or the same/16 network), the likelihood of the encoded character values of these two IP addresses being close to or similar to each other may be relatively high.

Once the IP addresses are transformed into the corresponding encoded character values, similarity distances between the IP addresses may be calculated. IP addresses having relatively high similarity distance (e.g., implying that their encoded character values are at least in part similar) may be categorized into a same group, as described below in further detail.

In an example, storing IP addresses of the same category (such as from the same network address) as a group, without storing further details of the IP addresses, result in efficient storage of at least some information associated with the IP addresses, as well as at least in part anonymizes the IP addresses.

Other anonymization techniques are also described below. For example, storage of an IP address may be further anonymized, e.g., by adding a random or pseudo-random seed value to the IP address, e.g., during the above-described transformation of the IP address to the corresponding encoded character value, as will be described later in this disclosure.

Transformation of an IP Address to Corresponding Encoded Character Values

An IP address may be transformed to corresponding encoded character values by, for example, using a transformation. Although BORT is used in one example, in another example another type of encoded character value transformation technique may also be used.

In an example, transformation of an IP address to corresponding encoded character values may comprise the following operations: (i) grouping of octets of the IP address, (ii) character ordinal determinations of the groups, and (iii) applying a character encoding algorithm to the determined character ordinal, such as using a base64 encoding, to generate encoded character value for the IP address.

• Grouping of Octets of an IP Address, for Transformation of the IP Address to Corresponding encoded character values As described above, for transformation of an IP address to corresponding encoded character values, the bits of the IP address are initially grouped in two or more groups. Bits of an IPv4 address may be grouped based on octets. For example, an example IP address 192.168.1.1 has four octets, such as (i) 192, (ii) 168, (iii) 001, and (iv) 001. Each such octet may be represented using 8 binary bits (and hence, termed as octets).

There are four octets in each IP address (e.g., assuming a IPv4 address). The four octets can be grouped in any different manner. FIG. 2 illustrates a table 200 depicting four example grouping arrangements of an example IP address 192.168.1.1.

As illustrated in FIG. 2, for the example IP address 192.168.1.1, an example first grouping may be as follows: (192)(168)(1)(1), where each octet is grouped in different groups. A second grouping may be as follows: (192.168)(1.1), where the first two octets are grouped in one group, and the last two octets are grouped in another. A third grouping may have the three octets grouped in one group, and the last octet grouped in another. Finally, a fourth grouping may have all four octets grouped in one group.

In an example, the grouping size (e.g., number of groups) can be related to the level of anonymization possible; as the grouping size decreases, the level of anonymity may increase. In an example, any selected one of the above-described grouping arrangements may be used for grouping the IP addresses. For example, in one implementation the grouping arrangement 1 (where each octet is grouped in different groups) may be used; whereas in another implementation the grouping arrangement 4 (where all octets are grouped in a same group) may be used.

• Character Ordinal Determinations of IP Addresses, for Transformation of the IP Address to Corresponding Encoded Characters Once the grouping of the octets of an IP address is performed, character ordinal determinations of the groups for an IP address is performed. For example, if a grouping arrangement has two or more groups (such as in the grouping arrangements 1, 2, and 3), for each group of the specific grouping arrangement the corresponding character ordinal is determined, and then the character ordinals from the multiple groups are concatenated. Also, if a given group has more than one octet, the octets are concatenated prior to determination of the corresponding character ordinal for the octet(s) within the group.

FIG. 3 illustrates a table 300 depicting character ordinal determinations for the four example grouping arrangements depicted in the table 200 of FIG. 2. For example, for group arrangement 1 (e.g., where the octets are grouped as (192)(168)(1)(1)), the character ordinal is determined as follows: CHR(192)||CHR(168)||CHR(001)||CHR(001), where || is a concatenation operator, and CHR( . . . ) is a function to convert the numeric value of one or more octets to corresponding a character value. In an example, a function "NCHAR_CS" may be used for the numeric to character conversion, although other numeric to character conversion for CHAR( . . . ) may also be used.

Similarly, for example, for grouping arrangement 2 (e.g., where the octets are grouped as (192.168)(1.1)), the character ordinal is determined as follows: CHR(192||168)||CHR(001||001). Thus, in this example, a first group has two octets 192 and 168. These two octets are first concatenated, and then the corresponding character ordinal is determined for the concatenated octets using the function CHAR( . . . ).

Similarly, for example, for grouping arrangement 3 (e.g., where the octets are grouped as (192.168.1)(1)), the character ordinal is determined as follows: CHR(192||168||001)||CHR(001).

Finally, for example, for grouping arrangement 4 (e.g., where the octets are grouped in a single group as (192.168.1.1)), the character ordinal is determined as follows: CHR(192||68||001||001).

Note that although FIGS. 2 and 3 illustrate four example grouping arrangements for an IP address, in actual implementation, one of these four grouping arrangements (or another grouping arrangement, such as (192.168) (1)(1)) may be selected, and the character ordinal determination may be performed for the selected grouping arrangement.

• Character Encoding of the Determined Character Ordinal, for Transformation of the IP Address to Corresponding Encoded Characters Once the character ordinal is determined for an IP address, the determined character ordinal is encoded using a character encoding algorithm. Any type of character encoding may be used, such as a binary-to-text encoding scheme, e.g., a base64 encoding merely as an example.

Base64 encoding refers to one or more binary-to-text encoding schemes that transforms binary data into a sequence of printable characters, limited to a set of 64 unique characters. For example, the source binary data is taken one or more bits (such as 6 bits) at a time, and the one or more bits are mapped into one of 64 unique characters. The 64 unique characters include 26 uppercase alphabets (A to Z), 26 lowercase alphabets (a to z), 9 numbers (0 to 9), and two other unique characters. The last two unique characters chosen may be implementation specific. Merly as an example, characters "+" and "/" may be chosen as the last two unique characters.

If needed, a padding with one or more equal sign "=" may be appended at the end of the base64 encoding result, such that these act as padding to ensure that the base64 result lengths are equally divisible by 4, for example.

Note that while some examples provided herein use base64 encoding, any other proprietary or standard binary-to-text encoding scheme may also be used instead. For example, ASCII (American Standard Code for Information Interchange) encoding may be used to transform the determined character ordinal to encoded characters.

FIG. 4 illustrates a table 400 depicting base64 encoding equations for the four example determined character ordinals corresponding to the four example grouping arrangements of table 300 of FIG. 3, and for the example IP address 192.168.1.1. Merely as an example, for grouping arrangement 1 (e.g., where the octets are grouped as (192)(168)(1)(1)), the base64 encoding would be as follows: Base64(CHR(192)||CHR(168)||CHR(001)||CHR(001)). Thus, referring to the first row of table 300 of FIG. 3, the character ordinal for this grouping arrangement is CHAR(192)||CHAR(168)||CHAR(1)||CHAR(1). In the first row of table 400 of FIG. 4, this character ordinal is encoded using the base64 encoding function Base64( . . . ) to generate the base64 encoded character value.

FIG. 5 illustrates a table 500 depicting base64 encoding results for the four example determined character ordinals corresponding to the four grouping arrangements of table 300 of FIG. 3, and for the example IP address 192.168.1.1. For example, for the grouping arrangement 1, the base64 encoding is provided as Base64(CHAR(192)||CHAR(168)||CHAR(1)||CHAR(1)). A result of this base64 encoding is AMAAqAABAAE=, as illustrated in the first row of the table 500. The "=" sign is padded, e.g., to ensure that the resultant set is divisible by 4.

Thus, if the grouping arrangement 1 is used, then the IP address 192.168.1.1 is transformed to encoded character values AMAAqAABAAE=; if grouping arrangement 2 is used, then the IP address 192.168.1.1 is transformed to encoded character values 7qgAAQ==, and so on, as illustrated in FIG. 5.

FIG. 6 illustrates a table 600 depicting encoded character values for various grouping arrangements and for various example IP addresses. The table 600 will be apparent, based on the above description with respect to the table 500.

Note that although FIGS. 2-5 illustrate four example possible grouping arrangements for an IP address, in actual implementation, one of these four grouping arrangements (or another grouping arrangement, such as (192.168) (1)(1)) may be selected, and the encoded character value may be determined for the selected grouping arrangement and for the corresponding IP address.

Distance Between IP Addresses

In an example, the encoded character values allow for the determination of likelihood that any number of IP addresses are close to one another. For example, if two IP addresses are within the same/24 network, the IP addresses are likely to have a lower editing distance between their encoded character values.

Similarity distances between various IP addresses are calculated, e.g., based on the corresponding encoded character values. In an example, an edit distance is used for such calculation. An edit distance (such as Levenshtein distance) between two words measures minimum number of single-character operations needed to transform one word into the other word. In an example, any other appropriate distance norm may also be used.

For example, if two IP addresses are within the same/24 network, the IP addresses are likely to have a lower edit distance between their encoded character values. The distance used is some examples herein is a similarity distance and is expressed as a percentage—a distance of 100 (such as 100%) between two encoded character values implies that the two encoded character values are the same. A lower value of the similarity distance between two encoded character values implies that the corresponding two IP addresses are relatively dissimilar (e.g., does not belong to the same/24 network).

FIG. 7 illustrates a table 700 depicting similarity distances between encoded character values corresponding to various grouping arrangements and for two example IP addresses 192.168.1.1 and 192.168.1.2. For example, for the IP address 192.168.1.1 and for the grouping arrangement 1 (e.g., where the IP address is grouped as (192)(168)(1)(1)), the corresponding encoded base64 character value is AMAAqAABAAE=(see FIGS. 5 and 6). Also, for the IP address 192.168.1.2 and for the grouping arrangement 1 (e.g., where the IP address is grouped as (192) (168)(1)(2)), the corresponding encoded base64 character value is AMAAqAABAAI=(see FIG. 6). These two encoded base64 character values are illustrated in the first row of the table 700 of FIG. 7. Comparing the two encoded base64 character values AMAAqAABAAE=and AMAAqAABAAI=, out of the 12 characters, the only difference is the last character ("E" in one, and "I" in the another). So, 11 out of 12 characters, such as 11/12×100 or about 91% characters match. Accordingly, a similarity distance of 91% is assigned in the first row of table 700 of FIG. 7.

Similarly, the similarity distance for these two IP addresses and for grouping arrangement 2 is 100%, as the two corresponding encoded character values match, as depicted in the second row of table 700. The similarity distances for these two IP addresses and for the other grouping arrangements are also depicted in FIG. 7.

Note that in table 700 and for grouping arrangement 2, both the IP addresses have the same encoded character value of 7qgAAQ==. In an example, these values are the same because the underlying calculated character values remain roughly the same when presented to be encoded with base64 encoding. In an example, this is due to how base64 maps characters to the default base64 map of available values.

FIG. 8 illustrates a table 800 depicting encoded character values corresponding to grouping arrangement 4 and for various example IP addresses. In the example of FIG. 8, all the IP values considered have the same first two octets (e.g., belongs to the same/16 network).

As seen from the first four rows of table 800, the first three octets are the same (192.168.1) are the same, while the fourth octet differs. For the grouping arrangement 4, as seen, the encoded character values also change accordingly. For example, for 192.168.1.1, the encoded character value is Oas=; and for 192.168.1.2, the encoded character value is Oaw=.

FIG. 9 illustrates a table 900 depicting a range of IP addresses covered by an encoded character value, for various grouping arrangements. For example, for grouping arrangements 1, 3, and 4, a corresponding encoded character value represents a single corresponding IP address. For example, for grouping arrangement 1, the encoded character value AMAAqAABAAE=is representative of a single IP address 192.168.1.1. Similarly, for grouping arrangement 4, the encoded character value Oas=is also representative of a single IP address 192.168.1.1.

However, due to the manner in which the encoded character values are generated, for grouping arrangement 2, the encoded character value 7qgAAQ==is representative of a range of IP addresses, ranging from 192.168.1.1 to 192.168.1.255. This is because all IP addresses within this range maps to the same encoded character value 7qgAAQ== (e.g., see discussion with respect to table 700 of FIG. 7, where two IP addresses map to the same encoded character value 7qgAAQ==for groping arrangement 2). Thus, for grouping arrangement 2, the same encoded character value may be used to store a plurality of IP addresses. Note that the mapping from the encoded character value 7qgAAQ==to the corresponding IP address may not be unique, as multiple IP addresses map to this encoded character value.

Storage of IP Addresses: Storage as a Group

In an example, IP addresses having encoded character values with similarity distances within a same range, such as with similarity distances more than a threshold value, are grouped in a same group, and stored as a group. Note that the distance used here is a similarity distance, and the greater the value of this similarity distance between two encoded character values, the higher is the match between the two encoded character values. For example, a similarity distance of 100 implies a 100% match between two encoded character values.

In an example, IP addresses, for which corresponding encoded character values have higher than a threshold similarity distances, are grouped in a same group. For example, assume that the threshold value for the similarity distance is 70. Also assume there are two IP addresses 192.168.1.1 and 192.168.1.2. Referring to the table 700 of FIG. 7, for any grouping arrangement, the similarity distance is 75 or more. Accordingly, irrespective of the selected or implemented grouping arrangement, the two IP addresses 192.168.1.1 and 192.168.1.2 are grouped in a same group, and stored together. On the other hand, if the threshold value is preconfigured to 90, then the two IP addresses 192.168.1.1 and 192.168.1.2 are grouped in a same group only if any of the grouping arrangements 1 or 2 are used (for which the similarity distances are 91 and 100, respectively).

FIG. 10 illustrates a table 1000 depicting three example storage arrangements for two example IP addresses 192.168.1.1 and 192.168.1.2. Note that in FIG. 10, it is assumed that grouping arrangement 4 is implemented. For example, that the encoded character value for the IP address 192.168.1.1 for grouping arrangement 4 is Oas=and the encoded character value for the IP address 192.168.1.2 for grouping arrangement 4 is Oaw=. This results in a similarity distance of 75.

When storing the two (or more) IP addresses as a group, a single encoded character value can be assigned to the group, which may be (i) Oas=, or (ii) Oaw=, or (iii) another appropriate encoded character value that is at least in part similar to (e.g., more than a threshold similarity distance from) these two encoded character values, for example, as illustrated in FIG. 10.

Note that a single encoded character value for all IP addresses belonging to the same group is stored, without individually storing the IP addresses within the group. Thus, in essence, all IP addresses within the same group are mapped to this single encoded character value.

For example, assuming grouping arrangement 4, any IP address having similarity distance within 70 of this encoded character value of Oas=may be stored in the same group. In this example, the encoded character value Oaw=corresponding to the IP address 192.168.1.2 is not stored.

Thus, in FIG. 10, assuming that Oas=is used to represent both the IP addresses 192.168.1.1 and 192.168.1.2, storage of the IP addresses are at least in part anonymized. Storing IP addresses of the same category (such as from the same network address) as a group, without storing further details of the IP addresses, result in efficient storage of at least some information associated with the IP addresses, as well as at least in part anonymizes the IP addresses. Some information about the IP addresses may be lost, but some other information about the IP addresses (such as/24 network information) about the IP addresses is retained.

Storage of IP addresses: Storage of Encoded Character Values Corresponding to Truncated IP Addresses (Where Pre-Configured Number of LSBs of Each IP Address is Set to Zero)

In an example, a number of most significant bits (MSBs) of each IP address, for which information is to be retained, is pre-configured. For example, if storage of a/24 network address or maximum CIDR value is desired, the first 3 octets (or first 24 MSBs) of each IP address are retained, and the remaining LSBs are set to zero. In another example, if storage of/19 network address is desired, the first 19 characters of the IP address are retained, and the remaining LSBs are set to zero.

Thus, a pre-configured number of least significant bits (LSBs) of each IP address are set to zero. The resultant IP addresses are referred to as truncated IP addresses. The truncated IP addresses are then then converted to corresponding encoded character values, as described above.

Thus, in this example, assuming that/24 network addresses of each IP addresses are considered (e.g., the 8 LSBs are set to zero), all IP addresses in the IP address range 192.168.001.001 to 192.168.001.255 are truncated to the same truncated IP address of 192.168.001.000. Encoded character value corresponding to the truncated IP address 192.168.001.000 is determined. Whenever an IP address within the IP address range 192.168.001.001 to 192.168.001.255 is to be stored, instead of storing the actual IP address (or an encoded character value corresponding to the actual IP address), the encoded character value corresponding to the truncated IP address 192.168.001.000 is stored. This would result in every IP address within the same/24 having the same encoded character value, thereby leading to anonymization of the IP addresses (albeit losing some information about the IP address, while retaining network information associated with the IP address).

In yet another example where only/16 network information is to be retained, IP addresses within the IP address range 192.168.001.001 to 192.168.255.255 are mapped to a single truncated IP address of 192.168.000.000. Then encoded character value corresponding to the truncated IP address 192.168.000.000 is determined. Whenever an IP address within the IP address range 192.168.001.001 to 192.168.255.255 is to be stored, instead of storing the actual IP address (or an encoded character value corresponding to the actual IP address), the encoded character value corresponding to the truncated IP address 192.168.000.000 is stored.

Note that in an example, once the IP addresses are truncated, there may not be a need to determine similarity distances between the IP addresses and grouping the IP addresses. Thus, in a scenario where the IP addresses are truncated, the encoded character values corresponding to the truncated IP addresses are stored directly, without needed to further group the encoded character values.

Storage of IP Addresses: Storing Each Individual Encoded Character Value of Each IP Address In a further example, encoded character values corresponding to the IP addresses are stored individually, without grouping the IP addresses and/or without truncating the IP addresses (e.g., without setting one or more LSBs of the IP address to zero). In such an example, due to the transformation of the IP addresses to the encoded character values, the IP addresses are at least in part anonymized, and hence, the encoded character values are stored directly.

Adding Seed Value to IP Addresses for Further Anonymity

Figure 11:
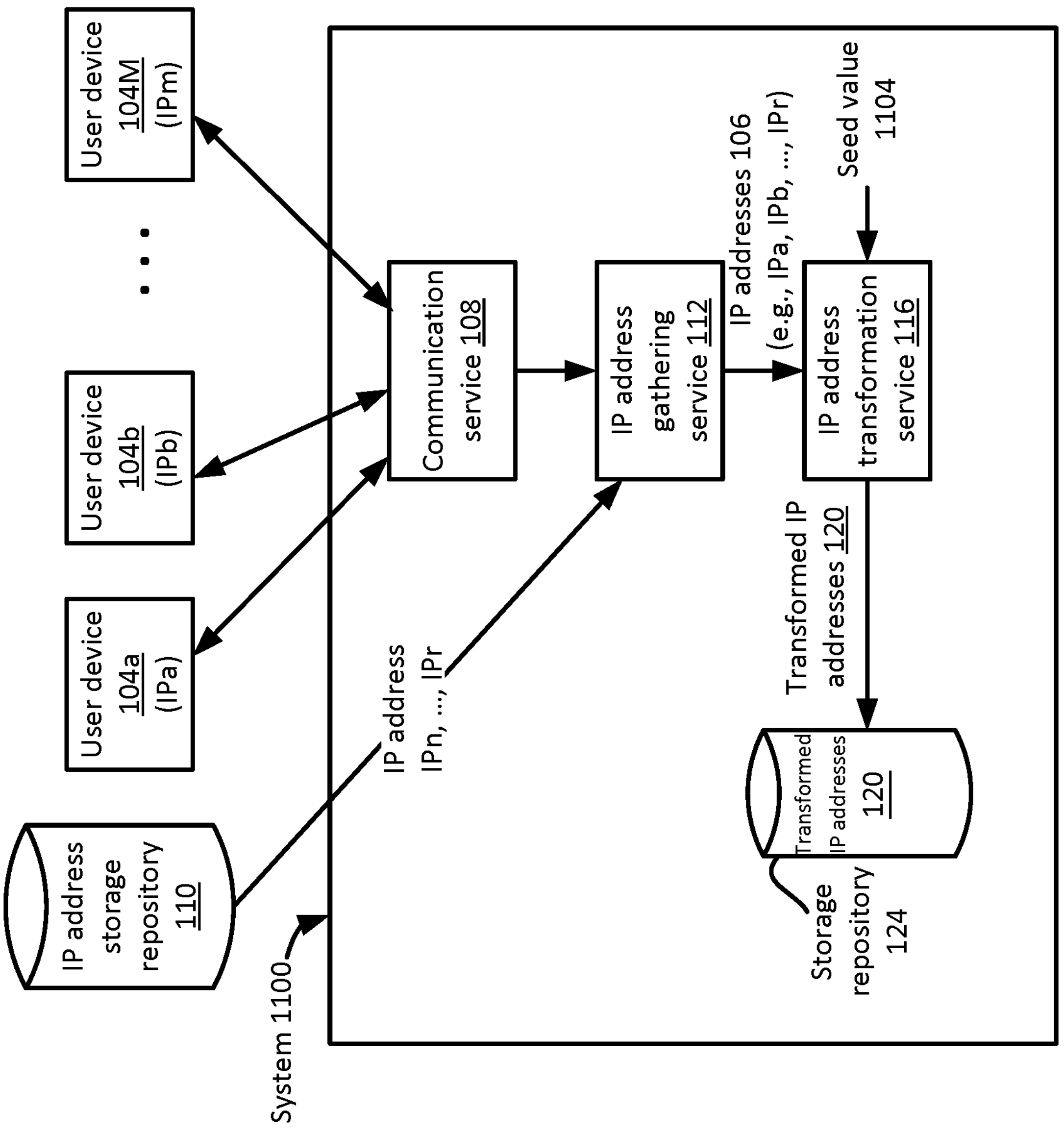
FIG. 11 illustrates a system for anonymizing IP addresses and storing the anonymized IP addresses, where a seed value is added to individual IP addresses to further cause anonymization.

FIG. 11 illustrates a system 1100 for anonymizing IP addresses and storing the anonymized IP addresses, where a seed value is added to individual IP addresses to further cause anonymization. The system 1100 of FIG. 11 is at least in part similar to the system 100 of FIG. 1. However, in the system 1100, a seed value 1104 is received by the IP address transformation service 116.

The seed value 1104 can be applied to the IP address in any of a number of manners. For example, the seed value 1104 can be applied to each grouping set or over the whole IP address, to further anonymize the resultant encoded character value. For example, referring to FIG. 3, the IP address 192.168.1.1 can be grouped as (192.168)(001.001) (grouping arrangement 2). In an example, the seed value 1104 can be applied to each of the group (192.168) and the group (001.001). For example, the seed value 1104 can be added to each of the groups (192.168) and (001.001).

Alternatively, in another example, the seed value 1104 can be added to the IP address as a whole. Thus, the new IP address may be the original IP address plus the seed value 1104. Here, the seed value if applied prior to grouping the IP address.

Note that each octet of the IP address has an upper limit of 255, which is a maximum number representable by the 8 bits of the octet. Accordingly, there may be a possibility that the application of the seed value causes an octet to go beyond this maximum value. Accordingly, in an example, further restrictions may be imposed to avoid moving outside this bound. For example, when converting the numbers of an octet of character, the maximum possible number that can be mapped to character is 255, and this maximum value may be maintained when applying the seed value.

One example manner to maintain this upper bound of individual octet may be to limit the maximum octet value to 255. Thus, any value above this above is truncated to this bound (or added to a preceding octet).

In another example, after application of the seed value, if the new value is outside this bound, it is further reduced to ensure compatibility. This may be done by setting a maximum ordinal value less than or equal to 8 digits and dividing by the grouping arrangement. If this new value is outside the character bounds, it is further reduced to ensure compatibility.

FIG. 12 illustrates encoded character values for different IP addresses and for different grouping arrangements, after application of a seed value. The example seed value used here is "264879982". Note that the encoded character values in the first row of table 1200 of FIG. 12 are different from those depicted in table 500. For example, without the seed value and for grouping arrangement 1, the IP address 192.168.1.1 transforms to AMAAqAABAAE=(see first row of table 500 of FIG. 5). However, after application of the seed value and for grouping arrangement 1, the IP address 192.168.1.1 now transforms to LX4tZiy/LL8=, as seen in FIG. 12. The seed value further anonymizes the resultant encoded character value.

In an example, the seed value may be generated in a random or at least pseudo-random manner. Thus, anonymization of the resultant encoded character value, based on application of the seed value, is also randomized or at least pseudo-randomized.

Various example storage strategies, e.g., for scenarios where no seed values are added to the IP addresses, were described above. As described above, in scenarios where seed values are not added to the IP addresses, anonymization of the IP addresses are achieved using techniques such as (i) converting IP addresses into corresponding encode character values, and storing multiple encode character values corresponding to multiple IP addresses as a group, (ii) truncating IP addresses by setting a pre-configured number of LSBs of the IP addresses to zero, and determining and storing the encode character values of the truncated IP addresses, and/or (iii) simply storing the encode character values corresponding to the IP addresses. One or more such techniques can also be applied for storing of IP addresses to which seed values have been applied.

In an example, the same seed value is applied to a plurality of (such as all of) IP addresses that are to be processed by the IP address transformation service 116.

Once a seed value is applied to the IP address, the modified IP address is transformed to the encoded character value, and the encoded character value is stored in accordance with one or more techniques described above. The original IP address (or at least a part of the IP address, such as the network part of the IP address) may not be retrievable from the encoded character value, unless one has access to the seed value. For example, if a service has access to the seed value, the service can do a reverse mapping from the encoded character value to the IP address (with the seed value applied to it), and then can "un-apply" (or remove the effect of application of the seed value) from this IP address, to determine the original IP address prior to application of the seed value. Thus, in an example, the seed value acts as a key (such as a decryption key), in case the IP address is to be derived from the corresponding encoded character value. Accordingly, in an example, the seed value may be privately and confidentially stored within the system 100, without public access to the seed value.

Methodologies

Figure 13:
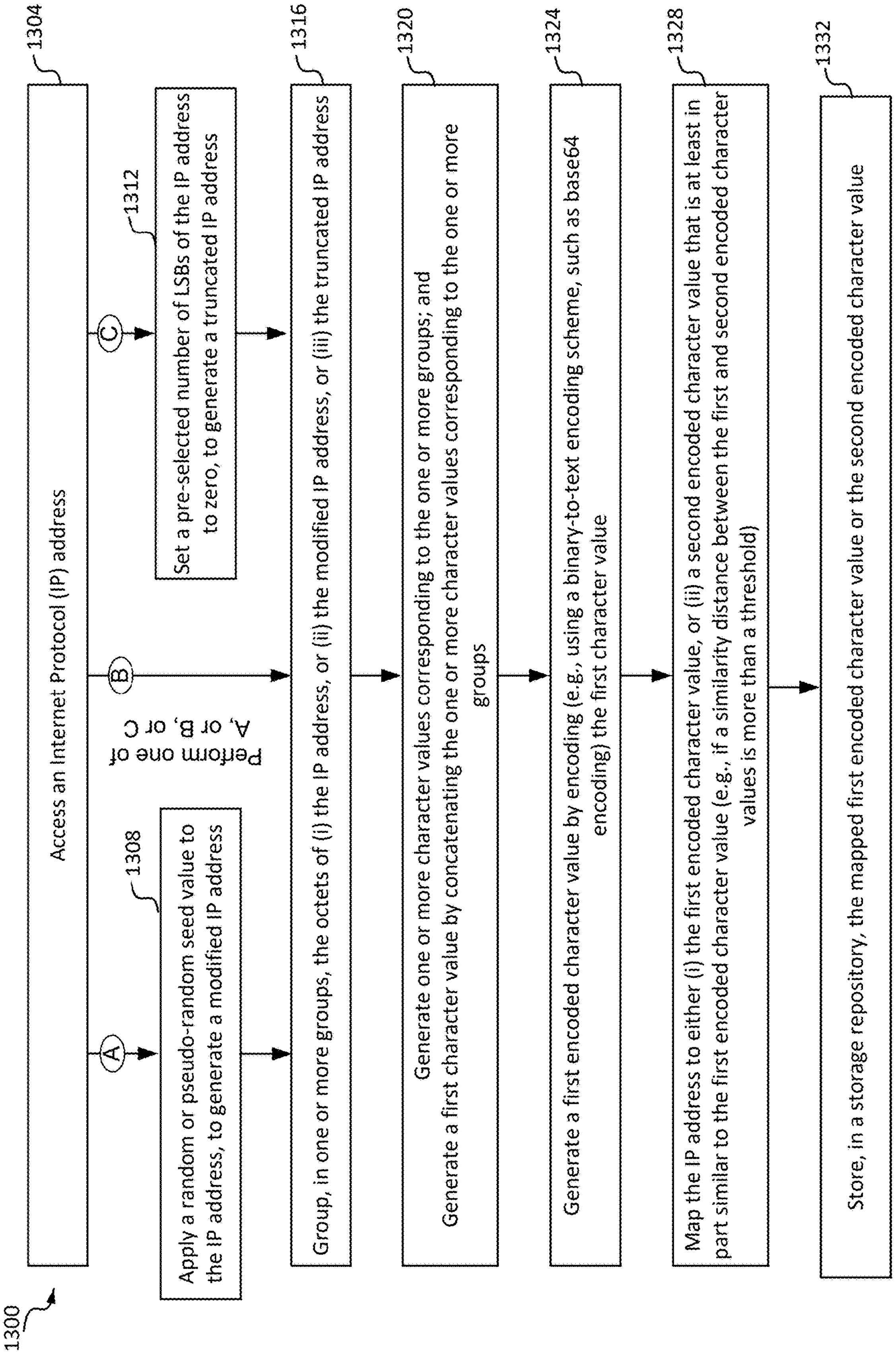
FIG. 13 illustrates a flow chart depicting an example method for anonymization and storage of IP addresses.

FIG. 13 illustrates a flow chart depicting an example method 1300 for anonymization and storage of Internet Protocol (IP) addresses. One or more operations of the method 1300 may be performed by the IP address transformation service 116 of FIG. 1.

At 1304 of method 1300, an IP address is accessed. In an example, the IP address may be an IPv4 IP address, as described above. In another example, the IP address may be an IPv6 address, and the teachings of this disclosure may be expanded to cover IPv6 addresses as well.

From 1304, the method 1300 may proceed through path A to block 1308, or through path B to block 1316, or through path C to block 1312. Whether the method 1300 takes path A, or path B, or path C may be implementation specific.

If the method 1300 takes path A, the method 1300 proceeds from 1304 to 1308. At 1308, a random or pseudo-random seed value is applied to the IP address, to generate a modified IP address. For example, as described above, the seed value may be applied to individual octets, or each group of octets, or to the IP address at its entirety. From 1308, the method 1300 proceeds to 1316, as illustrated in FIG. 13.

If the method 1300 takes path C, the method 1300 proceeds from 1304 to 1312. At 1312, a pre-selected number of LSBs of the IP address are set to zero, to generate a truncated IP address. Merely as an example and as described above in further detail, to preserve information associated with a/24 network part of the IP address, the first 24 bits (or 3 octets) of the IP address is preserved, and the 8 LSBs (or the last octet) are set to zero. From 1312, the method 1300 proceeds to 1316, as illustrated in FIG. 13.

If the method 1300 takes path C, the method 1300 proceeds from 1304 to directly 1316. Thus, the method 1300 may arrive from 1304 to 1316 either directly, or through one of 1308 or 1312, as illustrated in FIG. 13.

At 1316, the octets (such as four octets, if the IP address is an IPv4 address) of (i) the IP address, or (ii) the modified IP address, or (iii) the truncated IP address are grouped in one or more groups. Whether the grouping of (i), or (ii), or (iii) is performed is based on a path taken by method 1300 to arrive at 1316 from 1304. Note that here IPv4 address is assumed. However, if the IP address has an IPv6 format, more than four octets are possible.

At 1320, one or more character values corresponding to the one or more groups are generated, and a first character value for the first IP address is generated, e.g., by concatenating the one or more character values corresponding to the one or more groups. Generation of the first character value (also referred to herein as character ordinal) is discussed in further detail with respect to at least FIG. 3.

At 1324, a first encoded character value is generated by encoding (e.g., using a binary-to-text encoding scheme, such as base64 encoding) the first character value. For example, FIG. 4 illustrates generation of base64 encoding for various grouping arrangements for an example IP address.

At 1328, the IP address is mapped to either (i) the first encoded character value, or (ii) a second encoded character value that is at least in part similar to the first encoded character value. For example, the IP address may be mapped to the first encoded character value, e.g., if the seed value has been applied to the IP address or if the IP address is truncated (e.g., by setting LSBs to zero). Application of the seed value or truncation of the IP address anonymizes the IP address anyway-so, in such a scenario, there may not be a need to group multiple IP addresses based on similarity distances, and the first encoded character value may be stored directly stored for the IP address.

However, in another example, similarity distances may be used to group a plurality of IP address, and one encoded character value (such as the second encoded character value) for all IP addresses within the group may be stored. In such a scenario, all IP addresses within the group (e.g., including the IP address considered in method 1300) may be mapped to the second encoded IP address. For example, if a similarity distance between the first and second encoded character values is more than a threshold, the IP address is mapped to the second encoded character value.

At 1332, the mapped first encoded character value or the second encoded character value is stored within the storage repository 120. This, in this example, the IP address is transformed to the mapped first encoded character value or the second encoded character value, which is stored within the storage repository 120.

COMPUTER SYSTEM ARCHITECTURE

Figure 14:
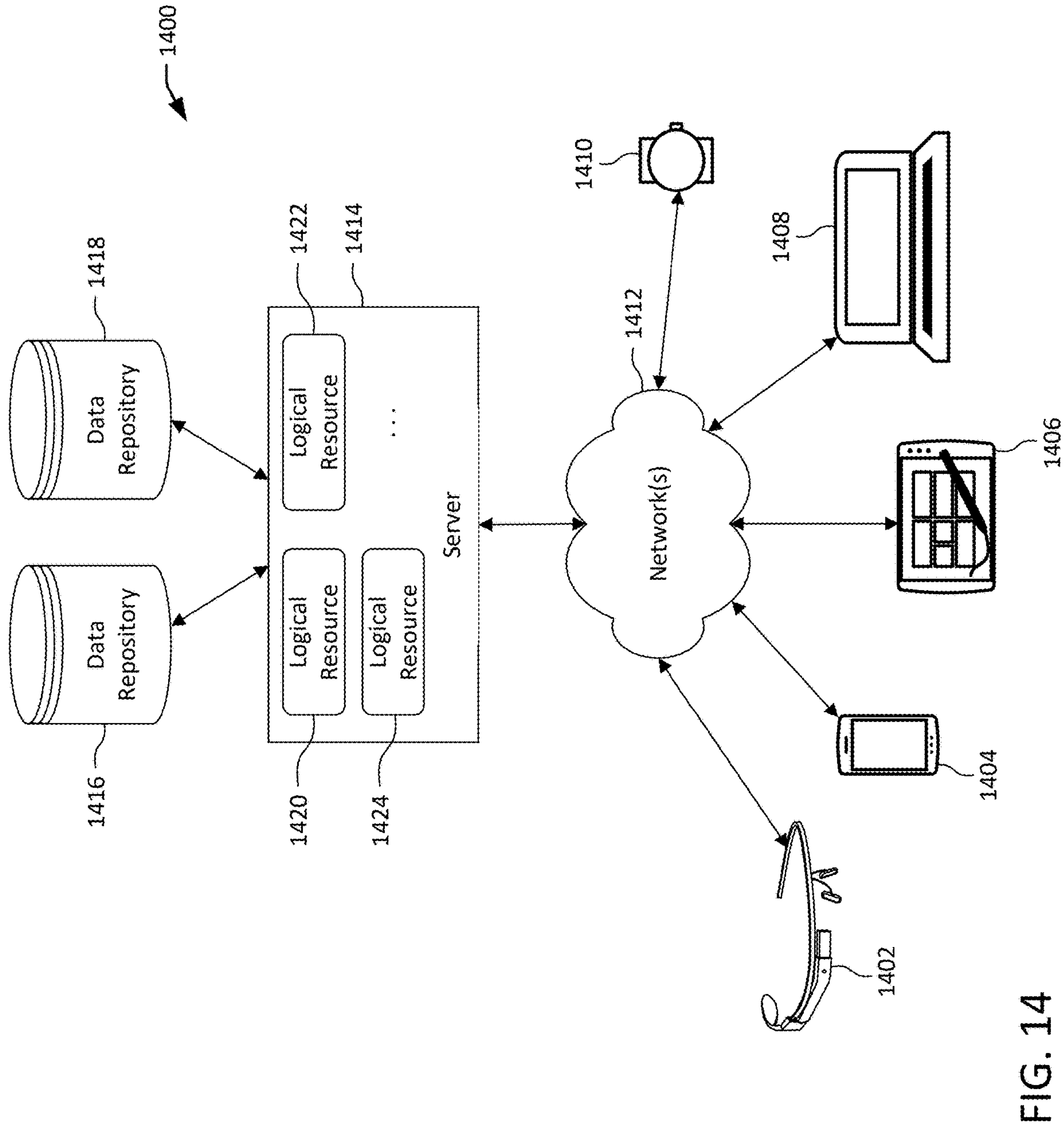
FIG. 14 depicts a simplified diagram of a distributed system for implementing certain aspects.

FIG. 14 depicts a simplified diagram of a distributed system 1400 for implementing an embodiment. In the illustrated embodiment, distributed system 1400 includes one or more client computing devices 1402, 1404, 1406, 1408, and/or 1410 coupled to a server 1414 via one or more communication networks 1412. Clients computing devices 1402, 1404, 1406, 1408, and/or 1410 may be configured to execute one or more applications.

In various aspects, server 1414 may be adapted to run one or more services or software applications that enable techniques for anonymization and storage of IP addresses.

In certain aspects, server 1414 may also provide other services or software applications that can include non-virtual and virtual environments. In some aspects, these services may be offered as web-based or cloud services, such as under a Software as a Service (SaaS) model to the users of client computing devices 1402, 1404, 1406, 1408, and/or 1410. Users operating client computing devices 1402, 1404, 1406, 1408, and/or 1410 may in turn utilize one or more client applications to interact with server 1414 to utilize the services provided by these components.

In the configuration depicted in FIG. 14, server 1414 may include one or more components 1420, 1422 and 1424 that implement the functions performed by server 1414. These components may include software components that may be executed by one or more processors, hardware components, or combinations thereof. It should be appreciated that various different system configurations are possible, which may be different from distributed system 1400. The embodiment shown in FIG. 14 is thus one example of a distributed system for implementing an embodiment system and is not intended to be limiting.

Users may use client computing devices 1402, 1404, 1406, 1408, and/or 1410 for techniques for anonymization and storage of IP addresses in accordance with the teachings of this disclosure. A client device may provide an interface that enables a user of the client device to interact with the client device. The client device may also output information to the user via this interface. Although FIG. 14 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 1412 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1412 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1414 may be composed of one or more general purpose computers, specialized server computers (including, by way of example, PC (personal computer) servers, UNIX® servers, LINUX® servers, mid-range servers, mainframe computers, rack-mounted servers, etc.), server farms, server clusters, a Real Application Cluster (RAC), database servers, or any other appropriate arrangement and/or combination. Server 1414 can include one or more virtual machines running virtual operating systems, or other computing architectures involving virtualization such as one or more flexible pools of logical storage devices that can be virtualized to maintain virtual storage devices for the server. In various aspects, server 1414 may be adapted to run one or more services or software applications that provide the functionality described in the foregoing disclosure.

The computing systems in server 1414 may run one or more operating systems including any of those discussed above, as well as any commercially available server operating system. Server 1414 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 1414 may include one or more applications to analyze and consolidate data feeds and/or event updates received from users of client computing devices 1402, 1404, 1406, 1408, and/or 1410. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1414 may also include one or more applications to display the data feeds and/or real-time events via one or more display devices of client computing devices 1402, 1404, 1406, 1408, and/or 1410.

Distributed system 1400 may also include one or more data repositories 1416, 1418. These data repositories may be used to store data and other information in certain aspects. For example, one or more of the data repositories 1416, 1418 may be used to store information for techniques for anonymization and storage of IP addresses. Data repositories 1416, 1418 may reside in a variety of locations. For example, a data repository used by server 1414 may be local to server 1414 or may be remote from server 1414 and in communication with server 1414 via a network-based or dedicated connection. Data repositories 1416, 1418 may be of different types. In certain aspects, a data repository used by server 1414 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 1416, 1418 may also be used by applications to store application data. The data repositories used by applications may be of different types such as, for example, a key-value store repository, an object store repository, or a general storage repository supported by a file system.

In one embodiment, server 1414 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 15:
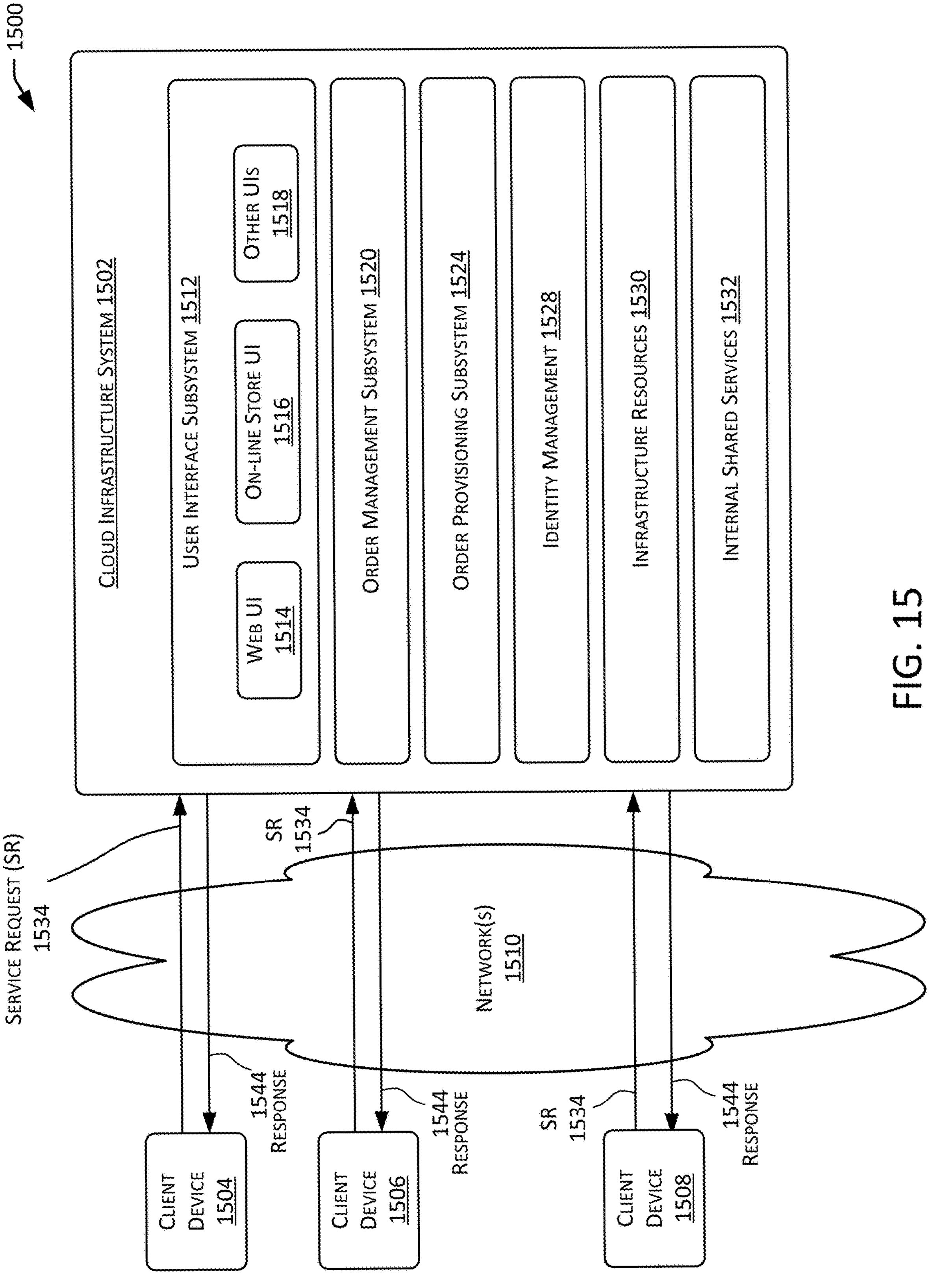
FIG. 15 is a simplified block diagram of one or more components of a system environment by which services provided by one or more components of an embodiment system may be offered as cloud services, in accordance with certain aspects.

FIG. 15 is a simplified block diagram of a cloud-based system environment in which anonymization and storage of IP addresses are performed, in accordance with certain aspects. In the embodiment depicted in FIG. 15, cloud infrastructure system 1502 may provide one or more cloud services that may be requested by users using one or more client computing devices 1504, 1506, and 1508. Cloud infrastructure system 1502 may comprise one or more computers and/or servers that may include those described above for server 1414. The computers in cloud infrastructure system 1502 may be organized as general purpose computers, specialized server computers, server farms, server clusters, or any other appropriate arrangement and/or combination.

Network(s) 1510 may facilitate communication and exchange of data between clients 1504, 1506, and 1508 and cloud infrastructure system 1502. Network(s) 1510 may include one or more networks. The networks may be of the same or different types. Network(s) 1510 may support one or more communication protocols, including wired and/or wireless protocols, for facilitating the communications.

The embodiment depicted in FIG. 15 is only one example of a cloud infrastructure system and is not intended to be limiting. It should be appreciated that, in some other aspects, cloud infrastructure system 1502 may have more or fewer components than those depicted in FIG. 15, may combine two or more components, or may have a different configuration or arrangement of components. For example, although FIG. 15 depicts three client computing devices, any number of client computing devices may be supported in alternative aspects.

The term cloud service is generally used to refer to a service that is made available to users on demand and via a communication network such as the Internet by systems (e.g., cloud infrastructure system 1502) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 1510 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 1502 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 1502 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 1502. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 1502. Cloud infrastructure system 1502 then performs processing to provide the services requested in the tenant's subscription order. Cloud infrastructure system 1502 may be configured to provide one or even multiple cloud services.

Cloud infrastructure system 1502 may provide the cloud services via different deployment models. In a public cloud model, cloud infrastructure system 1502 may be owned by a third party cloud services provider and the cloud services are offered to any general public tenant, where the tenant can be an individual or an enterprise. In certain other aspects, under a private cloud model, cloud infrastructure system 1502 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 1502 and the services provided may be shared by several organizations in a related community. Various other models such as hybrids of the above mentioned models may also be used.

Client computing devices 1504, 1506, and 1508 may be of different types (such as devices 1402, 1404, 1406, and 1408 depicted in FIG. 14) and may be capable of operating one or more client applications. A user may use a client device to interact with cloud infrastructure system 1502, such as to request a service provided by cloud infrastructure system 1502.

In some aspects, the processing performed by cloud infrastructure system 1502 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1502 for determining the intent of an utterance. The data used for this analysis may include structured data (e.g., data stored in a database or structured according to a structured model) and/or unstructured data (e.g., data blobs (binary large objects)).

As depicted in the embodiment in FIG. 15, cloud infrastructure system 1502 may include infrastructure resources 1530 that are utilized for facilitating the provision of various cloud services offered by cloud infrastructure system 1502. Infrastructure resources 1530 may include, for example, processing resources, storage or memory resources, networking resources, and the like.

In certain aspects, to facilitate efficient provisioning of these resources for supporting the various cloud services provided by cloud infrastructure system 1502 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1502 may itself internally use services 1532 that are shared by different components of cloud infrastructure system 1502 and which facilitate the provisioning of services by cloud infrastructure system 1502. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 1502 may comprise multiple subsystems. These subsystems may be implemented in software, or hardware, or combinations thereof. As depicted in FIG. 15, the subsystems may include a user interface subsystem 1512 that enables users of cloud infrastructure system 1502 to interact with cloud infrastructure system 1502. User interface subsystem 1512 may include various different interfaces such as a web interface 1514, an online store interface 1516 where cloud services provided by cloud infrastructure system 1502 are advertised and are purchasable by a consumer, and other interfaces 1518. For example, a tenant may, using a client device, request (service request 1534) one or more services provided by cloud infrastructure system 1502 using one or more of interfaces 1514, 1516, and 1518. For example, a tenant may access the online store, browse cloud services offered by cloud infrastructure system 1502, and place a subscription order for one or more services offered by cloud infrastructure system 1502 that the tenant wishes to subscribe to. The service request may include information identifying the tenant and one or more services that the tenant desires to subscribe to. For example, a tenant may place a subscription order for a chatbot related service offered by cloud infrastructure system 1502. As part of the order, the client may provide information identifying the input (e.g. utterances).

In certain aspects, such as the embodiment depicted in FIG. 15, cloud infrastructure system 1502 may comprise a service management subsystem (OMS) 1520 that is configured to process the new order. As part of this processing, OMS 1520 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 1520 may then invoke the service provisioning subsystem (OPS) 1524 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 1524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 1502 may send a response or notification 1544 to the requesting tenant to indicate when the requested service is now ready for use. In some instances, information (e.g., a link) may be sent to the tenant that enables the tenant to start using and availing the benefits of the requested services.

Cloud infrastructure system 1502 may provide services to multiple tenants. For each tenant, cloud infrastructure system 1502 is responsible for managing information related to one or more subscription orders received from the tenant, maintaining tenant data related to the orders, and providing the requested services to the tenant or clients of the tenant. Cloud infrastructure system 1502 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 1502 may provide services to multiple tenants in parallel. Cloud infrastructure system 1502 may store information for these tenants, including possibly proprietary information. In certain aspects, cloud infrastructure system 1502 comprises an identity management subsystem (IMS) 1528 that is configured to manage tenant's information and provide the separation of the managed information such that information related to one tenant is not accessible by another tenant. IMS 1528 may be configured to provide various security-related services such as identity services, such as information access management, authentication and authorization services, services for managing tenant identities and roles and related capabilities, and the like.

Figure 16:
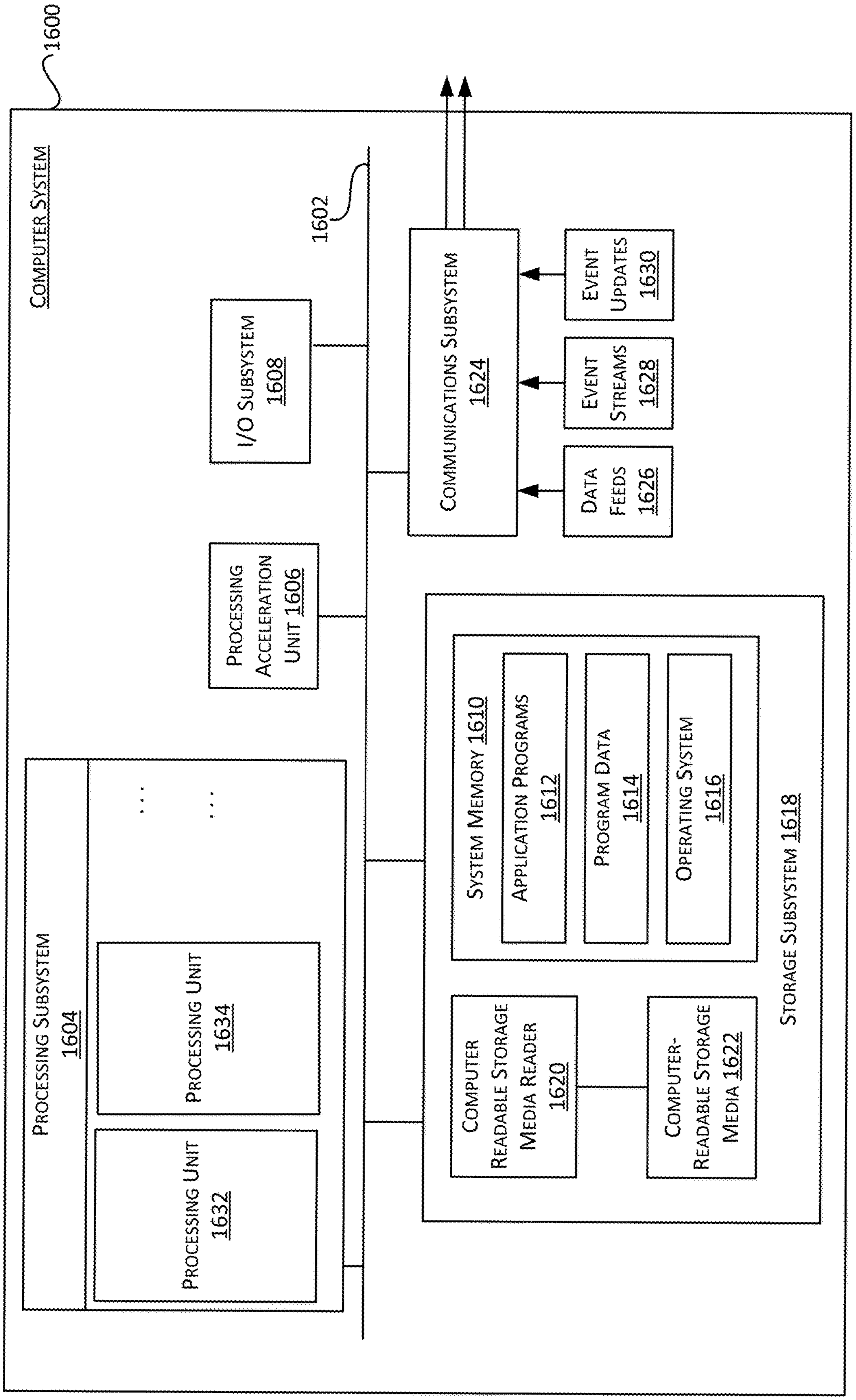
FIG. 16 illustrates an example computer system that may be used to implement certain aspects.

FIG. 16 illustrates an exemplary computer system 1600 that may be used to implement certain aspects. As shown in FIG. 16, computer system 1600 includes various subsystems including a processing subsystem 1604 that communicates with a number of other subsystems via a bus subsystem 1602. These other subsystems may include a processing acceleration unit 1606, an I/O subsystem 1608, a storage subsystem 1618, and a communications subsystem 1624. Storage subsystem 1618 may include non-transitory and/or transitory computer-readable storage media including storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative aspects of the bus subsystem may utilize multiple buses. Bus subsystem 1602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1604 controls the operation of computer system 1600 and may comprise one or more processors, application specific integrated circuits (ASICs), or field programmable gate arrays (FPGAs). The processors may be single core or multicore processors. The processing resources of computer system 1600 can be organized into one or more processing units 1632, 1634, etc. A processing unit may include one or more processors, one or more cores from the same or different processors, a combination of cores and processors, or other combinations of cores and processors. In some aspects, processing subsystem 1604 can include one or more special purpose co-processors such as graphics processors, digital signal processors (DSPs), or the like. In some aspects, some or all of the processing units of processing subsystem 1604 can be implemented using customized circuits, such as application specific integrated circuits (ASICs), or field programmable gate arrays (FPGAs).

In some aspects, the processing units in processing subsystem 1604 can execute instructions stored in system memory 1610 or on computer readable storage media 1622. In various aspects, the processing units can execute a variety of programs or code instructions and can maintain multiple concurrently executing programs or processes. At any given time, some or all of the program code to be executed can be resident in system memory 1610 and/or on computer-readable storage media 1622 including potentially on one or more storage devices. Through suitable programming, processing subsystem 1604 can provide various functionalities described above. In instances where computer system 1600 is executing one or more virtual machines, one or more processing units may be allocated to each virtual machine.

In certain aspects, a processing acceleration unit 1606 may optionally be provided for performing customized processing or for off-loading some of the processing performed by processing subsystem 1604 so as to accelerate the overall processing performed by computer system 1600.

I/O subsystem 1608 may include devices and mechanisms for inputting information to computer system 1600 and/or for outputting information from or via computer system 1600. In general, use of the term input device is intended to include all possible types of devices and mechanisms for inputting information to computer system 1600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1600 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 1618 provides a repository or data store for storing information and data that is used by computer system 1600. Storage subsystem 1618 provides a tangible non-transitory computer-readable storage medium for storing the basic programming and data constructs that provide the functionality of some aspects. Storage subsystem 1618 may store software (e.g., programs, code modules, instructions) that when executed by processing subsystem 1604 provides the functionality described above. The software may be executed by one or more processing units of processing subsystem 1604. Storage subsystem 1618 may also provide a repository for storing data used in accordance with the teachings of this disclosure.

Storage subsystem 1618 may include one or more non-transitory memory devices, including volatile and non-volatile memory devices. As shown in FIG. 16, storage subsystem 1618 includes a system memory 1610 and a computer-readable storage media 1622. System memory 1610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1600, such as during start-up, may typically be stored in the ROM. The RAM typically contains data and/or program modules that are presently being operated and executed by processing subsystem 1604. In some implementations, system memory 1610 may include multiple different types of memory, such as static random access memory (SRAM), dynamic random access memory (DRAM), and the like.

By way of example, and not limitation, as depicted in FIG. 16, system memory 1610 may load application programs 1612 that are being executed, which may include various applications such as Web browsers, mid-tier applications, relational database management systems (RDBMS), etc., program data 1614, and an operating system 1616. By way of example, operating system 1616 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 1622 may store programming and data constructs that provide the functionality of some aspects. Computer-readable media 1622 may provide storage of computer-readable instructions, data structures, program modules, and other data for computer system 1600. Software (programs, code modules, instructions) that, when executed by processing subsystem 1604 provides the functionality described above, may be stored in storage subsystem 1618. By way of example, computer-readable storage media 1622 may include non-volatile memory such as a hard disk drive, a magnetic disk drive, an optical disk drive such as a CD ROM, digital video disc (DVD), a Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 1618 may also include a computer-readable storage media reader 1620 that can further be connected to computer-readable storage media 1622. Reader 1620 may receive and be configured to read data from a memory device such as a disk, a flash drive, etc.

In certain aspects, computer system 1600 may support virtualization technologies, including but not limited to virtualization of processing and memory resources. For example, computer system 1600 may provide support for executing one or more virtual machines. In certain aspects, computer system 1600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1600. Accordingly, multiple operating systems may potentially be run concurrently by computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to establish a communication channel to one or more client devices via the Internet for receiving and sending information from and to the client devices. For example, the communications subsystem may be used to transmit a response to a user regarding the inquiry for a chatbot.

Communications subsystem 1624 may support both wired and/or wireless communication protocols. For example, in certain aspects, communications subsystem 1624 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 1624 can provide wired network connectivity (e.g., Ethernet) in addition to or instead of a wireless interface.

Communications subsystem 1624 can receive and transmit data in various forms. For example, in some aspects, in addition to other forms, communications subsystem 1624 may receive input communications in the form of structured and/or unstructured data feeds 1626, event streams 1628, event updates 1630, and the like. For example, communications subsystem 1624 may be configured to receive (or send) data feeds 1626 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1624 may be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1624 may also be configured to communicate data from computer system 1600 to other computer systems or networks. The data may be communicated in various different forms such as structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 1600 depicted in FIG. 16 is intended only as a specific example. Many other configurations having more or fewer components than the system depicted in FIG. 16 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A non-transitory computer-readable medium including instructions that when executed by one or more processors, cause a system including the one or more processors to perform operations including:

accessing an Internet Protocol (IP) address;

processing the IP address, wherein processing the IP address comprises generating a character value;

encoding the character value using an encoding scheme, to generate a first encoded character value for the IP address;

mapping the IP address to either (i) the first encoded character value, or (ii) a second encoded character value that is at least in part similar to the first encoded character value; and storing, in a storage repository, the mapped first encoded character value or the second encoded character value.

2. The non-transitory computer-readable medium of claim 1, wherein processing the IP address comprises:

applying a seed to the IP address, to generate a modified IP address; and generating the character value corresponding to the modified IP address.

3. The non-transitory computer-readable medium of claim 2, wherein the operations further comprise:

randomly or pseudo-randomly generating the seed.

4. The non-transitory computer-readable medium of claim 1, wherein processing the IP address comprises:

setting a pre-selected number of least significant bits of the IP address to zero, to generate a truncated IP address; and generating the character value corresponding to the truncated IP address.

5. The non-transitory computer-readable medium of claim 1, wherein mapping the IP address comprises:

subsequent to generating the first encoded character value for the IP address, determining a similarity distance between the first encoded character value and the second encoded character value; and in response to the similarity distance being more than a threshold, mapping the IP address to the second encoded character value.

6. The non-transitory computer-readable medium of claim 1, wherein the operations further comprise:

for each IP address of a plurality of IP addresses, generating a corresponding plurality of encoded character values;

determining that similarity distances between each of the plurality of encoded character values and the second encoded character value is more than a threshold value; and in response to the similarity distances being more than the threshold, mapping the plurality of IP address to the second encoded character value.

7. The non-transitory computer-readable medium of claim 1, wherein the character value is a first character value, processing the IP address comprises:

identifying four octets within the IP address or a modified version of the IP address;

grouping, in two or more groups, the four octets;

for each group of the two or more groups, generating a corresponding character value, such that two or more character values are respectively generated for the two or more groups; and concatenating the two or more character values, to thereby generate the first character value.

8. The non-transitory computer-readable medium of claim 7, wherein:

grouping the four octets comprises grouping the four octets of the modified version of the IP address; and the operations further comprise generating the modified version of the IP address by one of (i) setting a pre-selected number of least significant bits (LSBs) of the IP address to zero or (ii) applying a seed to the IP address.

9. The non-transitory computer-readable medium of claim 8, wherein:

generating the modified version of the IP address comprises applying the seed to the IP address; and applying the seed to the IP address comprises one of (i) applying the seed to each group of the two or more groups, or (ii) applying the seed to an entirety of the IP address.

10. The non-transitory computer-readable medium of claim 1, wherein the IP address is a first IP address, wherein the character value is a first character value, and wherein the operations further include:

processing a second IP address, wherein processing the second IP address comprises generating a second character value; and encoding the second character value using the encoding scheme, to generate the first encoded character value for the second IP address, such that the first encoded character value is generated for both the first and the second IP addresses.

11. The non-transitory computer-readable medium of claim 1, wherein the encoding scheme is a binary-to-text encoding scheme.

12. The non-transitory computer-readable medium of claim 1, wherein the encoding scheme is a base64 encoding scheme.

13. The non-transitory computer-readable medium of claim 1, wherein the IP address is a IPv4 (Internet Protocol version 4) IP address.

14. The non-transitory computer-readable medium of claim 1, wherein the IP address is a IPv6 (Internet Protocol version 6) IP address.

15. A method comprising:

accessing an Internet Protocol (IP) address;

processing the IP address, wherein processing the IP address comprises generating a character value;

encoding the character value using an encoding scheme, to generate a first encoded character value for the IP address;

mapping the IP address to either (i) the first encoded character value, or (ii) a second encoded character value that is at least in part similar to the first encoded character value; and storing, in a storage repository, the mapped first encoded character value or the second encoded character value.

16. The method of claim 15, wherein processing the IP address comprises:

applying a seed to the IP address, to generate a modified IP address; and generating the character value corresponding to the modified IP address.

17. The method of claim 15, wherein processing the IP address comprises:

setting a pre-selected number of least significant bits of the IP address to zero, to generate a truncated IP address; and generating the character value corresponding to the truncated IP address.

18. The method of claim 15, wherein mapping the IP address comprises:

subsequent to generating the first encoded character value for the IP address, determining a similarity distance between the first encoded character value and the second encoded character value; and in response to the similarity distance being more than a threshold, mapping the IP address to the second encoded character value.

19. A system comprising:

one or more processors; and one or more non-transitory computer-readable media storing instructions, which, when executed by the system, cause the system to perform operations including:

accessing an Internet Protocol (IP) address;

processing the IP address, wherein processing the IP address comprises generating a character value;

encoding the character value using an encoding scheme, to generate a first encoded character value for the IP address;

mapping the IP address to either (i) the first encoded character value, or (ii) a second encoded character value that is at least in part similar to the first encoded character value; and storing, in a storage repository, the mapped first encoded character value or the second encoded character value.

20. The system of claim 19, wherein processing the IP address comprises:

applying a seed to the IP address, to generate a modified IP address; and generating the character value corresponding to the modified IP address.

* * * * *